United States Patent
Drachsler et al.

(10) Patent No.: US 9,297,305 B2
(45) Date of Patent: Mar. 29, 2016

(54) TURBOSHAFT ENGINE WITH PARALLEL SHAFTS

(75) Inventors: Antoine Drachsler, Gan (FR); Alain Michel Perbos, Idron (FR); Joel Silet, Rontignon (FR)

(73) Assignee: TURBOMECA, Bordes (FR)

( * ) Notice: Subject to any disclaimer, the term of this patent is extended or adjusted under 35 U.S.C. 154(b) by 1044 days.

(21) Appl. No.: 13/395,212

(22) PCT Filed: Sep. 29, 2010

(86) PCT No.: PCT/FR2010/052057
§ 371 (c)(1),
(2), (4) Date: Mar. 9, 2012

(87) PCT Pub. No.: WO2011/033244
PCT Pub. Date: Mar. 24, 2011

(65) Prior Publication Data
US 2012/0167591 A1    Jul. 5, 2012

(30) Foreign Application Priority Data
Sep. 17, 2009   (FR) ...................................... 09 56412

(51) Int. Cl.
*F02C 3/14*    (2006.01)
*F02C 3/10*    (2006.01)
*F02C 3/05*    (2006.01)

(52) U.S. Cl.
CPC ... *F02C 3/14* (2013.01); *F02C 3/05* (2013.01); *F02C 3/103* (2013.01); *F02C 3/145* (2013.01);
(Continued)

(58) Field of Classification Search
CPC .............. F02C 3/10; F02C 3/103; F02C 3/05; F02C 3/145; F02C 7/36; F05D 2250/232; F05D 2250/312; F05D 2250/231; F02K 3/12

USPC ........................................................ 60/39.162
See application file for complete search history.

(56) References Cited

U.S. PATENT DOCUMENTS 2,933,892 A     4/1960  Howard
3,635,019 A *   1/1972  Kronogard et al. ........ 60/39.163
(Continued)

FOREIGN PATENT DOCUMENTS

EP    0 691 512    1/1996
FR    1 467 556    1/1967
(Continued)

OTHER PUBLICATIONS

International Search Report Issued Mar. 1, 2011 in PCT/FR10/52057 Flled Sep. 29, 2010.

*Primary Examiner* — Phutthiwat Wongwian
*Assistant Examiner* — Stefan Ibroni
(74) *Attorney, Agent, or Firm* — Oblon, McClelland, Maier & Neustadt, L.L.P.

(57) ABSTRACT

A free-turbine turboshaft engine including a gas generator including at least one compressor supplied with air, a combustion chamber receiving the compressed air at the output of the compressor, and at least one generator turbine mechanically connected to the compressor by a drive shaft and driven by gases from combustion of fuel carried out in the combustion chamber, and including a free turbine supplied by the gases from the combustion after passing through the generator turbine and which drives a power shaft positioned non-coaxially relative to the drive shaft of the gas generator and supplying the power of the turboshaft engine via a reduction gear. The combustion chamber is a substantially cylindrical or frusto-conical chamber, coaxial with the axis of the generator turbine, and includes a single injector.

13 Claims, 2 Drawing Sheets

(52) U.S. Cl.
CPC ..... *F05D 2250/231* (2013.01); *F05D 2250/232* (2013.01); *F05D 2250/311* (2013.01); *F05D 2250/312* (2013.01); *Y02T 50/671* (2013.01)

(56) References Cited

U.S. PATENT DOCUMENTS

| | | | |
|---|---|---|---|
| 3,818,695 A | | 6/1974 | Rylewski |
| 4,213,297 A | * | 7/1980 | Forster et al. .............. 60/39.511 |
| 4,704,861 A | | 11/1987 | Mowill |
| 4,825,645 A | * | 5/1989 | Bell, III .......................... 60/791 |
| 5,855,112 A | | 1/1999 | Bannai et al. |
| 6,735,954 B2 | * | 5/2004 | MacFarlane et al. ........... 60/793 |
| 2002/0148227 A1 | | 10/2002 | MacKay |
| 2002/0152754 A1 | | 10/2002 | MacKay |
| 2005/0056021 A1 | | 3/2005 | Belokon et al. |

FOREIGN PATENT DOCUMENTS

| | | |
|---|---|---|
| FR | 1 530 430 | 6/1968 |
| GB | 594 207 | 11/1947 |
| GB | 2 117 052 | 10/1983 |
| JP | 10 184386 | 7/1998 |

* cited by examiner

TURBOSHAFT ENGINE WITH PARALLEL SHAFTS

BACKGROUND OF THE INVENTION

1. Field of the Invention

The field of the present invention is that of aeronautic propulsion, and in particular that of turboshaft engines with gas generator and free turbine.

2. Description of the Related Art

Turbine engines are commonly used for aircraft propulsion and in particular for propulsion and lift for rotary-wing aircraft or helicopters. These engines comprise a gas generator consisting of a compressor, an annular combustion chamber and a turbine known as a generator turbine which drives the compressor by means of a shaft, known as a generator shaft. The gas generator is generally a single spool gas generator, that is to say it comprises just one compressor and a single turbine, both connected by a single shaft, but it may also be a multi-spool gas generator, that is to say it may comprise a plurality of compressors and a plurality of turbines, each compressor being connected to a turbine by a specific shaft. The gases leaving the gas generator are then sent to a second turbine, known as a free turbine, which is associated with a power shaft, distinct from the shaft(s) of the generator, which provides the power needed for propulsion. This shaft drives a reduction gearbox connected to the main gearbox of the helicopter (or MGB), which drives the hub of the main rotor and the anti-torque rotor. This reduction assembly is generally integrated into an accessories gearbox for the equipment necessary for good operation of the engine or the aircraft.

For reasons of structural simplicity, the free turbine is generally positioned downstream of the last generator turbine and the shaft which it drives is coaxial with the shaft of the gas generator. This power shaft may exit towards the rear of the engine or alternatively, as is more usually the case, be concentric with the shaft of the gas generator and return towards the front. With the objective of compactness and/or ease of access, this configuration makes it possible to position the reduction gearbox and the accessories gearbox on a level with the air inlet of the gas generator.

These engines with concentric shafts, such as, for example that described in British Patent GB 594207, have the drawback of being complex to produce, which makes it somewhat difficult to produce them at relatively low cost. To this is added the complexity of the combustion chamber, due to its annular shape, which likewise hinders the reduction of production costs; this annular shape requires a large number of injection points, which, in small engines, complicates the introduction of devices for reducing nitrogen oxide (NOx) emissions.

BRIEF SUMMARY OF THE INVENTION

The object of the present invention is to remedy these drawbacks by proposing a small turboshaft engine which does not display certain problems of prior art turboshaft engines and which is of simple design to reduce its production costs, while allowing the incorporation of devices for reducing NOx emissions.

To this end, the invention provides a turboshaft engine with free turbine comprising on the one hand a gas generator comprising at least one compressor supplied with air, a combustion chamber receiving the compressed air leaving said compressor, and at least one generator turbine connected mechanically to said compressor by a drive shaft and driven by the gases arising from fuel combustion carried out in said combustion chamber, and further comprising a free turbine supplied with the gases arising from said combustion after passage thereof through said generator turbine and which drives a power shaft oriented non-coaxially with the drive shaft of the gas generator and supplying the turboshaft engine power via a reduction gearbox, characterized in that the combustion chamber is a substantially cylindrical or frustoconical chamber, coaxial with the axis of the generator turbine and comprising a single injector.

Coaxial shafts mean two shafts which are situated in the extension of one another, whatever their relative direction of rotation.

This arrangement of the shafts provides great flexibility for the arrangement of the two parts of the engine and makes it possible to select a "single can" combustion chamber, that is to say one that is substantially cylindrical or frustoconical in shape with a single injector placed at the center of said cylinder or truncated cone, which allows easy integration of an injection system enabling reduced formation of nitrogen oxides. A combustion chamber coaxial with the axis of the generator turbine has the advantage of not creating excessive bulk, which would not be compatible with one of the objectives sought, namely of producing a small turboshaft engine. Furthermore, the gases leaving the combustion chamber are sent directly to the turbine of the generator, which prevents the presence of a chamber bottom which would otherwise be necessary for regulating the flow thereof and which would require cooling. In the light of the very high temperature of the gases leaving the combustion chamber in modern engines, the claimed configuration avoids this operation, which would be particularly difficult to implement.

The power shaft is preferably oriented parallel to said drive shaft. This arrangement makes the engine very compact. Even more preferably, the reduction gearbox is associated with an accessories gearbox, the two being positioned in the longitudinal direction substantially on a level with the air inlet of the compressor. Compactness is improved further in this way and the reduction gearbox/accessories gearbox assembly is situated in a relatively cool zone.

The combustion chamber preferably comprises an injector incorporating LPP (or Lean Premixed Prevaporized) technology. The cylindrical or frustoconical shape of the chamber permits the installation of an injector of this type which is relatively bulky but which is optimized for reducing nitrogen oxide emissions.

In one embodiment, the outlet of the combustion chamber is oriented towards the compressor. This arrangement contributes to the compactness of the engine.

The gases arising from combustion are preferably collected in an annular collector positioned downstream of the generator turbine for transfer to an annular distribution chamber positioned upstream of the free turbine.

The casing of the reduction gearbox/accessories gearbox and the casing of the gas generator are advantageously combined into a single casing. The design of the device for lubricating the assembly is facilitated in this way and the single casing is lighter and less expensive.

In one particular embodiment, the gas generator is a multi-spool generator comprising a high pressure compressor and a low pressure compressor together with a high pressure turbine and a low pressure turbine, said turbines driving said compressors by means respectively of a high pressure drive shaft and a low pressure drive shaft, the power shaft driven by the free turbine not being coaxial with the high pressure drive shaft of said generator and the combustion chamber being coaxial with the high pressure drive shaft.

In the case of a multi-spool turboshaft engine, the power shaft is preferably coaxial with the low pressure drive shaft. And still more preferably, the low pressure drive shaft is hollow and has the power shaft passing through it.

In particular embodiments, the turboshaft engine is provided with a high speed electrical generation alternator, and/or with a hot gas/compressed air heat exchanger, between the gases leaving the free turbine and the air leaving the compressor.

The invention also relates to a turboshaft engine comprising at least one device as described above.

BRIEF DESCRIPTION OF THE SEVERAL VIEWS OF THE DRAWINGS

The invention will be better understood, and other objectives, details, features and advantages thereof will become more clearly apparent from the following detailed explanatory description of a number of embodiments of the invention given by way of non-limiting illustrative examples, said description being made with reference to the appended schematic drawings, in which.

DETAILED DESCRIPTION OF THE INVENTION

Figure 1:
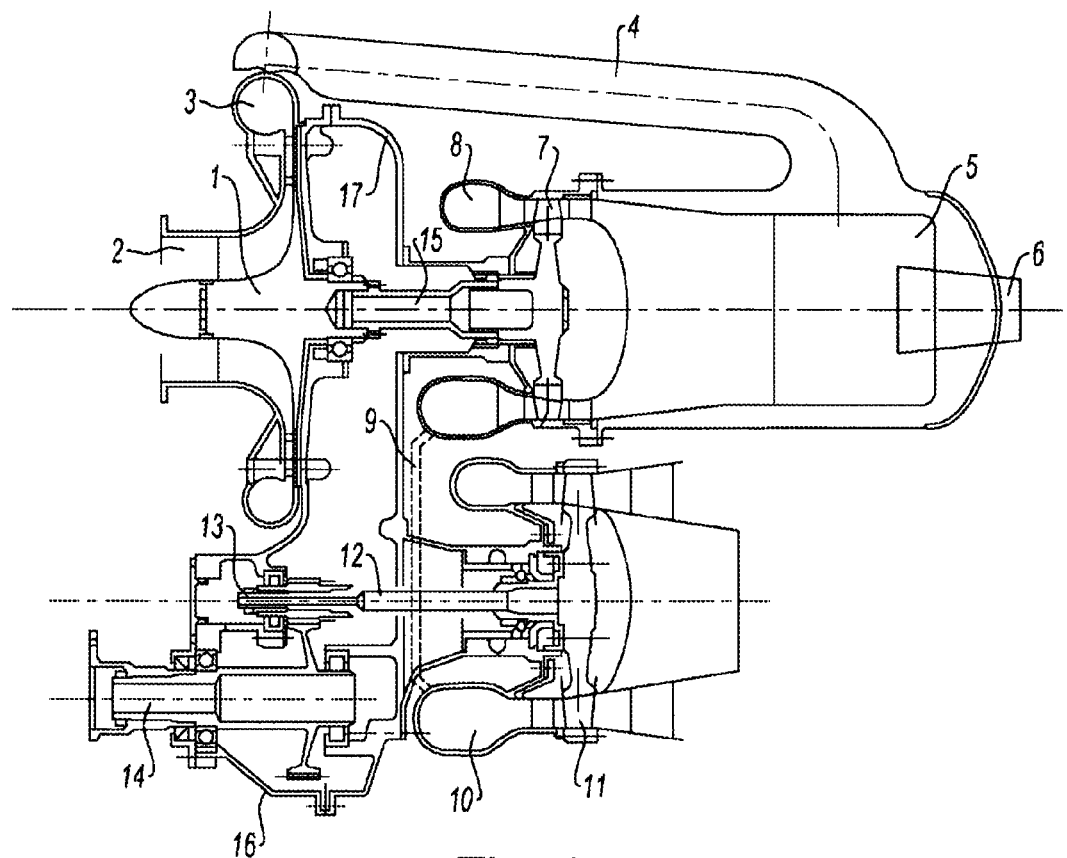
FIG. 1 is a schematic, sectional view of a turboshaft engine according to one embodiment of the invention.

FIG. 1 is a sectional view of a turboshaft engine with free turbine made in two parts positioned side by side, a first part comprising all the elements constituting the gas generator and a second part combining the elements constituting the free turbine and the reduction gearbox. The first part comprises a compressor 1, shown here in the form of a centrifugal compressor, into which air enters through an intake port 2 and which discharges the compressed air into an outlet scroll 3. The scroll is disposed in a ring around the compressor, with a constantly increasing section for collecting this compressed air and sending it, by means of upstream transfer pipes 4, into a cylindrical combustion chamber 5, where it takes part in combustion of a fuel injected by an injector 6. The gases arising from this combustion undergo first expansion in a generator turbine 7, connected to the compressor 1 by a generator shaft 15, and are then collected in an annular collector 8 to pass to the second part of the engine. The rotating parts of the gas generator which require lubrication, such as the bearings or gears, are contained in an engine casing 17.

Figure 3:
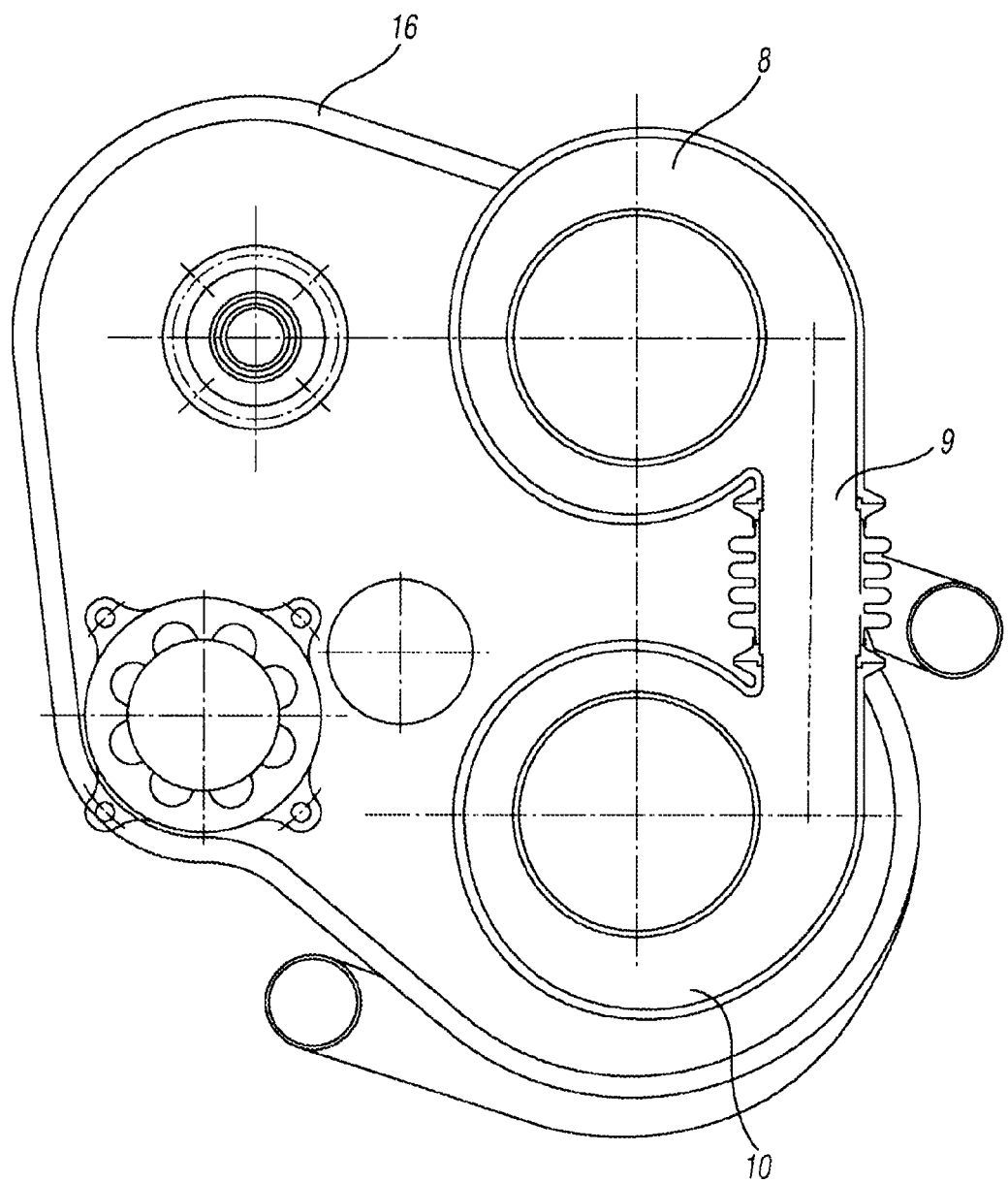
FIG. 3 is a schematic view of a pipe for transferring gases between two parts of a turboshaft engine according to the invention.

On leaving the generator turbine 7 the gases are transferred from the annular collector 8 into a distribution chamber 10 located upstream of the free turbine via a downstream transfer pipe 9, shown schematically in FIG. 1 and in more detail in FIG. 3.

The gases leave the distribution chamber 10 by passing through the free turbine 11, where they undergo second expansion, supplying their energy to the free turbine. The free turbine is mounted on a power shaft 12 which recovers the energy supplied by the gases. This power shaft 12 is coupled to the reduction gearbox 13, to reduce its speed of rotation and transmit the power to the main helicopter gearbox (not shown), by means of a gear shaft 14. The reduction gearbox/accessories gearbox is contained in a gearbox casing 16.

The two parts constituting the turboshaft engine are disposed, as indicated in FIG. 1, parallel to one another such that the mechanical parts which require lubrication are combined in one and the same zone. The gearbox casing 16 and the gas generator casing 17 constitute one and the same casing, which facilitates lubrication of all these parts and makes it possible to reduce the total mass of this element.

As a result of the selected structure, with separation of the turboshaft engine into two parts, the combustion chamber 5 does not have the drive shaft 15 passing through it, as is the case in prior art engines. Elimination of the constraints associated with the presence of this shaft offers new design possibilities for the form which the chamber may assume, with it in particular being possible for it to assume a cylindrical form as shown in FIG. 1. It also exhibits the opposite orientation from that of prior art engines, with the gas outlet being oriented towards the compressor 1. The drive shaft may thus be considerably shortened and is therefore simpler to manufacture and ultimately lighter.

Figure 2:
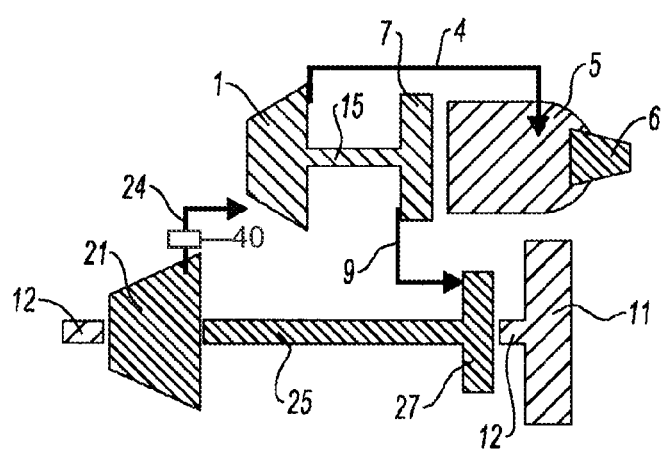
FIG. 2 is a schematic diagram of a twin spool turboshaft engine with free turbine, produced according to one embodiment of the invention.

With reference now to FIG. 2, a second embodiment will now be described, in which the invention is applied to a twin spool turboshaft engine. The two generator shafts 15 and 25 of the low and high pressure spools of the gas generator are not in this case coaxial. The shaft of the low pressure spool 25 is, on the other hand, hollow and has the power shaft 12 of the free turbine passing through it.

In this second embodiment, the turboshaft engine operates in a manner similar to the previous operation in the first embodiment, with air being drawn in via an inlet port and then compressed in the low pressure (or BP) compressor 21. This air is then transferred via a first upstream transfer pipe 24 into the high pressure (HP) compressor 1. After a second compression operation, performed by the HP compressor, it is transferred via a second upstream transfer pipe 4 into a cylindrical combustion chamber 5 and takes part in combustion of the fuel introduced into said chamber via an injector 6. After combustion, the gases are expanded in a high pressure turbine 7, connected mechanically to the HP compressor 1 by an HP drive shaft 15, and pass, via a downstream transfer pipe 9, into a distribution chamber positioned upstream of the BP turbine. From this distribution chamber, they pass through a BP turbine 27 which drives the BP compressor 21 by means of the BP shaft 25. On leaving the BP turbine, they are sent to a free turbine 11 which drives the power shaft 12, as before.

In the configuration shown in FIG. 2, the power shaft 12 passes through the hollow BP drive shaft 25 to enter the reduction gearbox 13. In contrast, the HP drive shaft turns separately, being mechanically independent of the other two shafts. Rotating the power shaft 12 inside the BP drive shaft 25 does not here entail the drawbacks encountered in prior art single spool turboshaft engines with coaxial shafts, insofar as the speed of rotation of the BP shaft is relatively low and comparable in value to that of the power shaft 12.

The turboshaft engine to which the invention relates thus displays the following characteristics, inter alia:
  a gas generator on one shaft line and a free turbine on a second shaft line not coaxial with the first,
  a "single can" combustion chamber, that is to say substantially cylindrical or frustoconical in form, located on the downstream side of the gas generator, with respect to the direction of flow of the gases, with a single injector,
  a single casing for the lubricated rotating parts of the gas generator and for the main gearbox.

The configuration described above is associated with a certain number of advantages.

It facilitates a "low cost" design for the turboshaft engine, through the selection, first of all, of a common casing for the parts to be lubricated of the gas generator, the reduction gearbox and the accessories gearbox, then a single can combustion chamber and finally through the absence of concentric shafts (or, in the case of a twin spool embodiment, just two concentric shafts instead of three).

Integration of the engine in the helicopter is facilitated by the choice of a gas generator positioned parallel to the assembly associated with the free turbine and by more extensive integration of the assembly formed by the free turbine and the reduction gearbox. This makes the turboshaft engine more compact than those of the prior art.

Furthermore, this integration is effected while continuing, as was the case in the prior art with coaxial shafts, to position the reduction gearbox in a cool zone of the helicopter, situating it on the side on which air is drawn into the gas generator and not on the exhaust gas discharge side.

The design in two easily separable parts, one for the gas generator and one for the free turbine and drive of the accessories, provides the turboshaft engine with a modular structure which facilitates maintenance and reduces maintenance costs.

The drive shaft 15 of the gas generator (or the HP drive shaft in the case of a multi-spool engine), since another shaft does not pass through it, may have a smaller diameter and consequently be optimized in terms of mechanical strength and mass.

Finally, the engine retains an air inlet and an exhaust oriented axially relative to the engine, which prevents the need for scrolls for unbending gas flow and the losses of output which would be caused.

This engine configuration is furthermore compatible with various accessories which improve operation of the turboshaft engines, such as a high speed alternator, or starter alternator, which makes it possible to reduce specific consumption by 2 to 3%, an injector 6 incorporating LPP (Lean Premixed Prevaporized) reduced NOx emission technology, which is relatively bulky but use of which is made possible by the size and cylindrical or frustoconical shape of the combustion chamber 5, or indeed a heat exchanger 40 arranged at the exhaust gas outlet, which reduces specific consumption by approximately 10% by reheating the air leaving the compressor 1 (or the BP compressor 21 in the case of a multi-spool turboshaft engine). The general arrangement of the turboshaft engine with parallel shafts, given the elimination of the power shaft at the heart of the gas generator and offsetting of the accessories from the axis of said generator, greatly facilitates installation of such devices.

Although the invention has been described in relation to a number of specific embodiments, it is obvious that it is in no way limited thereto and that it covers all the technical equivalents of the means described together with combinations thereof provided they fall within the scope of the invention.

The invention claimed is:

1. A turboshaft engine with a free turbine for an aircraft, comprising:
    a gas generator comprising at least one compressor supplied with air;
    a combustion chamber receiving compressed air leaving the compressor;
    at least one generator turbine connected mechanically to the compressor by a drive shaft and driven by gases arising from fuel combustion carried out in the combustion chamber;
    a free turbine supplied with the gases arising from the combustion after passage thereof through the generator turbine, and which drives a power shaft not in an extension of the drive shaft of the gas generator, and supplying the turboshaft engine power via a reduction gearbox, wherein the generator turbine is of axial type and the combustion chamber is a substantially cylindrical or frustoconical chamber, in an extension of the axis of the generator turbine, and comprising a single injector; wherein the power shaft is oriented parallel to the drive shaft; and wherein the reduction gearbox is associated with an accessories gearbox, the two gearboxes being positioned in the longitudinal direction on a level with an air inlet of the compressor.

2. The turboshaft engine as claimed in claim 1, wherein a casing of the reduction gearbox/accessories gearbox and a casing of the gas generator are combined into a single casing.

3. The turboshaft engine as claimed in claim 1, wherein the combustion chamber comprises an injector incorporating Lean Premixed Prevaporized (LPP) technology.

4. The turboshaft engine as claimed in claim 1, wherein an outlet of the combustion chamber is oriented towards the compressor.

5. The turboshaft engine as claimed in claim 1, wherein the gases arising from combustion are collected in an annular collector positioned downstream of the generator turbine for transfer into an annular distribution chamber positioned upstream of the free turbine.

6. The turboshaft engine as claimed in claim 1, wherein the gas generator is a multi-spool generator comprising a high pressure compressor and a low pressure compressor together with a high pressure turbine and a low pressure turbine, the turbines driving the compressors by respectively a high pressure drive shaft and a low pressure drive shaft, the power shaft driven by the free turbine not being in an extension of the high pressure drive shaft of the generator and the combustion chamber being in the extension of the high pressure drive shaft.

7. The turboshaft engine as claimed in claim 6, wherein the low pressure drive shaft is hollow and the power shaft passes through the low pressure drive shaft.

8. The turboshaft engine as claimed in claim 7, wherein the power shaft and the low pressure drive shaft are concentric.

9. The turboshaft engine as claimed in claim 1, on which a high speed alternator is mounted.

10. The turboshaft engine as claimed in claim 1, further comprising a hot gas/compressed air heat exchanger, between the gases leaving the free turbine and the air leaving the compressor.

11. An aircraft propelled by a turboshaft engine as claimed in claim 1.

12. The turboshaft engine as claimed in claim 1, wherein the combustion chamber comprises only a single injector.

13. The turboshaft engine as claimed in claim 1, wherein the drive shaft does not pass through the combustion chamber.

* * * * *